(12) United States Patent
Natarajan et al.

(10) Patent No.: US 6,735,652 B2
(45) Date of Patent: May 11, 2004

(54) DETECTING THE OCCURRENCE OF DESIRED VALUES ON A BUS

(75) Inventors: Venkatesh Natarajan, Bangalore (IN); Rajendra S. Marulkar, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 392 days.

(21) Appl. No.: 09/848,978

(22) Filed: May 3, 2001

(65) Prior Publication Data

US 2002/0166012 A1 Nov. 7, 2002

(51) Int. Cl.[7] ........................ G06F 13/00; G06F 11/00
(52) U.S. Cl. ................................... 710/100; 714/34
(58) Field of Search .......................... 714/25, 34, 35, 714/36, 45; 340/146.2; 710/100

(56) References Cited

U.S. PATENT DOCUMENTS

| | | | | |
|---|---|---|---|---|
| 4,338,660 A | * | 7/1982 | Kelley et al. ................. | 714/34 |
| 4,675,646 A | * | 6/1987 | Lauer ...................... | 340/146.2 |
| 4,812,964 A | * | 3/1989 | Kiya et al. ..................... | 700/26 |
| 5,717,851 A | * | 2/1998 | Yishay et al. ................. | 714/25 |
| 5,764,885 A | * | 6/1998 | Sites et al. ..................... | 714/45 |
| 5,931,956 A | * | 8/1999 | Neff ............................. | 714/34 |

\* cited by examiner

*Primary Examiner*—Khanh Dang
(74) *Attorney, Agent, or Firm*—Robert D. Marshall, Jr.; W. James Brady, III; Frederick J. Telecky, Jr.

(57) ABSTRACT

A circuit determining whether a present value transmitted on a bus equals any of several desired values. The circuit may contain a monitor random access memory (RAM) and a monitor circuit. The bits of a desired value at a second set of positions are stored in a location (of the monitor RAM) having an address formed by the bits of the desired value at the first set of positions. When a value ("present value") is transmitted on the bus, the bits of the present value at the first set of positions are provided as an address to the monitor RAM, which generates the bits stored in the addressed location as output. The monitor circuit compares the output of monitor RAM with the bits of the present value at the second set of positions to generate a result. The result indicates if the a desired value has occurred on the bus.

14 Claims, 1 Drawing Sheet

US 6,735,652 B2

DETECTING THE OCCURRENCE OF DESIRED VALUES ON A BUS

BACKGROUND OF THE INVENTION

1. Field of the Invention

The present invention relates to digital processing systems, and more specifically to a method and apparatus for detecting the occurrence of desired values on a bus.

2. Related Art

Buses often transfer values between components in digital processing systems (e.g., computers, machine controllers, calculators, etc.). For example, a processor sends an address of an addressable unit (e.g., memory unit or peripheral units) and receives data stored at the addressed location. Both the address and data are transmitted on a bus during such transactions. The addresses, data, and any digital values in general, are together referred to as values in the subject patent application.

A need often exists to detect the occurrence of desired values on a bus. For example, a programmer may wish to know the execution of a specific sub-routine contained in a large program, and the access of a memory location corresponding to the entry point of the sub-routine may thus be of interest. Thus, when the address of the memory location occurs on a bus storing the program instructions, the programmer can determine that the sub-routine has been accessed.

Several approaches have been used in the prior art which enable a programmer to detect the occurrence of desired values on a bus. In one approach ("first approach"), a set of comparators may be used, with each comparator comparing a bit of the value on the bus with a corresponding bit of the desired value to be detected. When all the comparators indicate match, the desired value is deemed to have occurred. One problem with such an approach is that a large number of comparators may be required when many values have to be detected. Accordingly, the approach may not scale well at least to situations when a large number of desired values are to be detected.

An alternative approach ("second approach") may address some of the deficiencies of the first approach if the values to be detected are consecutive, that is, falling within a range. In such an alternative approach, only a subset (typically the more significant bits) of the bits on the bus may be compared. The compared bit positions determine a range as is well known in the relevant arts. If a match is detected, a programmer may determine that one of the values in the range has occurred on the bus. One problem with the alternative approach is that it may be desirable to detect the occurrence of specific value (s), and the approach may not provide such information.

Another approach ("third approach") may overcome the noted problem of the second approach. The third approach may use a page-lookup random access memory (RAM) containing the same number of locations as the number of values possibly represented on a bus, but only with a single bit in each location. Each bit (memory location) of the page-lookup table may be set to one logical value to indicate that the corresponding value needs to be detected, and to another logical value otherwise.

Each value on the bus is also provided as an address to the page-lookup RAM, and the output of the page-lookup RAM indicates whether a desired value has been transmitted on the bus. Thus, using the third approach one may conveniently detect the occurrence of any desired address values (can be random). However, the approach generally requires that a page-lookup RAM have the same number of locations as the number of values possibly represented on the bus, and may not be suitable in environments using large bus width. In general, large RAMs consume a corresponding amount of space, and minimizing space consumption is desirable in many environments.

Therefore, what is needed is a method and an apparatus which potentially minimizes the additional space consumed and can yet efficiently detect the occurrence of any desired values on a bus.

SUMMARY OF THE INVENTION

A detection circuit provided in accordance with the present invention detects the occurrence of one or more desired values on a bus without requiring a large memory. In one embodiment, the detection circuit contains a monitor random access memory (RAM) and a monitor circuit. The monitor RAM contains multiple locations, with each location being addressed by a corresponding X-bit address.

Each desired value is associated with a corresponding location (in the monitor RAM) if the bits at a first set of positions matches the corresponding bits of the X-bit address (of the location). Each location contains the bits corresponding to a second set of positions of an associated desired value.

The value ("present value") transmitted on the bus forms the input to the detection circuit. The bits corresponding to the first set of positions of the present value are provided as an address to the monitor RAM. The monitor RAM provides the data stored at a location corresponding to the address as an output.

Monitor circuit may contain comparators which compare the output of the monitor RAM with the bits corresponding to the second set of positions of the present value to generate a result. The result indicates whether the present value equals at least one of the desired values.

Another aspect of the present invention enables multiple desired values to share the same values in the first set of positions. In one embodiment, multiple monitor RAMs are used, with different desired values sharing the same bits in the first of positions being stored at the same address in different RAMs.

Alternatively, each of the memory locations of the monitor RAM contains multiple cells, with each cell storing the bits at the second set of position of a corresponding desired value. Thus, each cell may contain a number of bits equal to the bits in the second set of positions.

The monitor circuit may contain a number of comparators equal to the number of cells in each monitor RAM location. Each comparator compares the content of the corresponding cell with the bits corresponding to the second set of positions of the present value. As a result, the output of a comparator indicates whether a desired value equals the present value received on the bus. In one embodiment, each RAM location contains four cells and accordingly four comparators may be employed.

One more aspect of the present invention enables a flag to be associated with each cell. The flag is set to one logical value (e.g., 1) if the corresponding cell stores data representing a desired value and to another logical value (0) otherwise. A valid desired value is said to be present when the flag indicates that the cell contains data representing a desired value. The comparators may generate a match only if the flag of a compared cell indicates that a desired value is represented.

According to one more aspects of the present invention, the number of bits in the first set of positions and the number of bits in the second set of positions equal the total number of bits in the desired value. In such a situation, the value in each cell (in association with the address of the location) represents a corresponding desired value. However, the bits in the first and second set of positions, need not be equal to the total number of bits in the desired value. When such an equality does not exists, the value in each cell represents a range of desired values.

In addition, the first set of positions and the second set of positions may be implemented to be in consecutive positions for simplicity of design. However, alternative embodiments can be implemented in which the positions are not consecutive. The detection circuit may be implemented in several environments such as general purpose computer systems and real time embedded systems.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention can be used to determine whether a present value on a bus equals any one of several desired values. A random access memory (RAM) may be used to efficiently make such a determination. The RAM is referred to as a monitor RAM to differentiate from RAMs ("data RAM") used for storing data and instructions. The manner in which the determination can be made is described below in further detail.

The values (both present and desired) may logically be viewed as being formed by a number of bits at corresponding positions. The positions may be partitioned as containing at least two sets, referred to as a first set of positions and a second set of positions. A desired value is associated with a location of the monitor RAM only if the bits (of the desired value) together at the first set of positions equal the address of the location. The content of a location of the monitor RAM is set to the bits (of the associated desired value) in the second set of positions.

In operation, when a present value is transmitted on a bus, the bits of the present value corresponding to the first set of positions are provided as an address to the monitor RAM. The content of the accessed location are compared with the bits corresponding to the second set of positions of the present value. The present value is deemed to equal the desired value associated with the accessed monitor RAM location.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
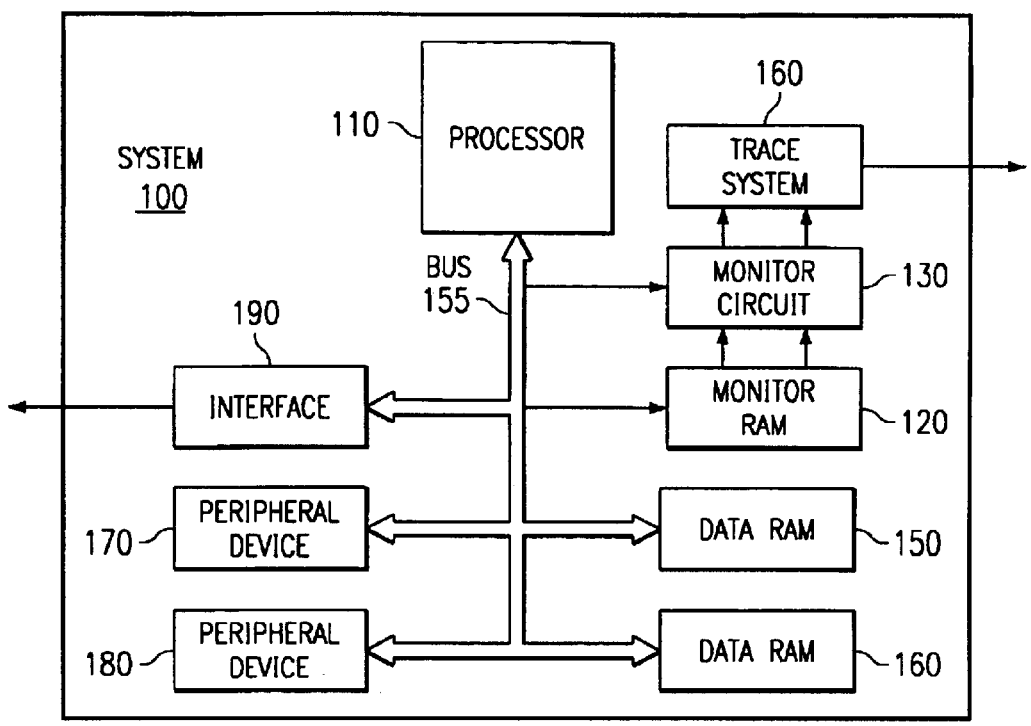
FIG. 1 is a block diagram illustrating an example environment in which the present invention can be implemented.

FIG. 1 is a block diagram illustrating an example environment in which the present invention can be implemented. There is shown system 100 containing processor 110, monitor RAM 120, monitor circuit 130, trace block 140, data RAMs (random access memories) 150–160, interface 190 and peripheral devices 170–180. Each component is described in further detail below.

Processor 110 accesses the data values stored in data RAMs 150–160 by sending an address on bus 155. Thus, bus 155 generally carries addresses sent by processor 110 and the data values transmitted in response. The data (address and data values) transmitted on bus 155 is referred to as a present value. The present invention can be used to determine whether the present value equals any one of a desired set of values.

In one embodiment, a general purpose computer system represents system 100, and processor 110 is referred to as a central processing unit (CPU). Alternatively, system 100 may represent special purpose processing systems such as those used in real-time embedded systems. In general, system 100 may be implemented in different types of environments. Processor 110 and data RAMs 150 and 160 may be implemented in a known way.

Peripheral devices 170 and 180 are used for input or output operations. For example, in a computer system, keyboards, printers, etc., are examples peripheral devices. Interface 190 may be used to control one or more external systems. The need to control external systems typically exists in real-time environments (e.g., an external motor being controlled by system 100). Peripheral devices 170 and 180, and data RAMs 150 and 160 are examples of addressable units and are referred to as such because data available from the units can be accessed by sending a corresponding address.

Trace system 140 receives signals indicating whether a present value matches a desired value, and traces the states of various signals and components, typically around the time of occurrence of a desired value on bus 155. The manner in which the signals may be generated is described below. Trace system 140 may be implemented in a known way.

Monitor RAM 120 may be configured by a programmer to specify a desired set of values. Only a small number of memory locations may be required by using a convention provided in accordance with an aspect of the present invention. Monitor circuit 130 and monitor RAM 120 together may be referred to as a detection circuit, and operate to compare each of the present values transmitted on bus 155 with the specified desired set of values to determine if a match exists. The manner in which such a comparison can be made is described below with reference to example embodiment(s).

3. Monitor Ram and Monitor Circuit

Figure 2:
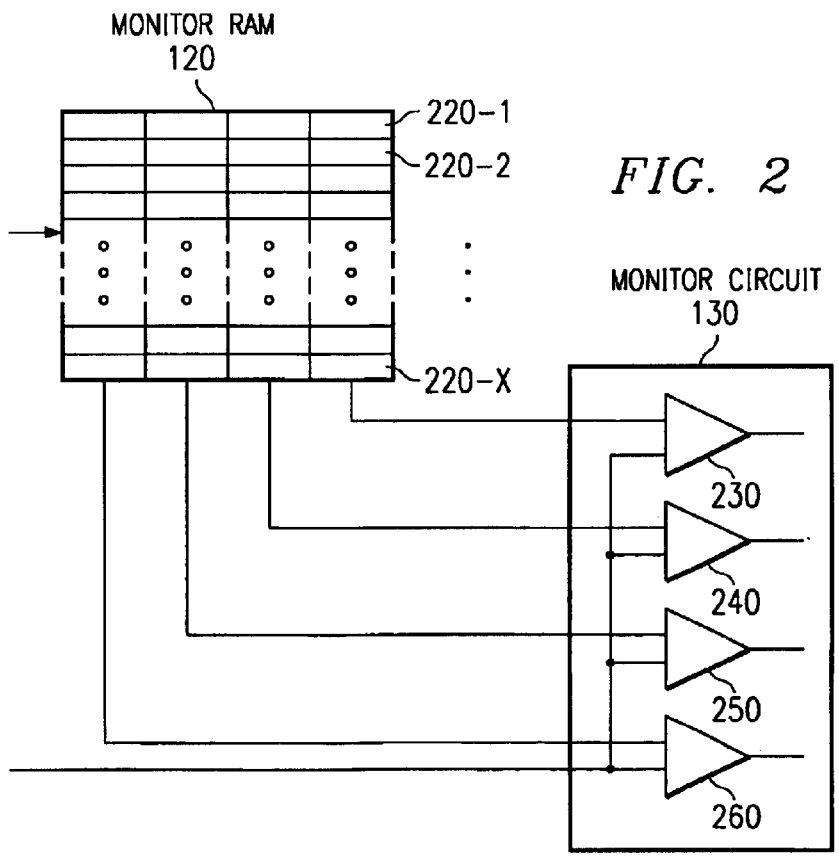
FIG. 2 is a block diagram illustrating the details of an embodiment of a multiplexer in accordance with the present invention.

FIG. 2 is a block diagram illustrating the details of monitor RAM 120 and monitor circuit 130, in one embodiment. Monitor RAM 120 is shown containing a number of memory locations 220-1 through 220-X, with each memory location having a specific address. The address of each memory location and the data stored in that memory location together represent a desired value (or values) sought to be monitored by a programmer as described below in further detail. The corresponding convention is described first.

With respect to the convention, each value contains a number of bits at corresponding bit positions. Assuming an N-bit value, each value has bit positions 0 to (N−1). Some of the bit positions are viewed as being part of a first set of positions and some other of the bit positions are viewed as being part of a second set of positions. For simplicity it is assumed that the positions in the two sets together contain all the N-bits. Thus, the first set may contain bit positions 0 through X, and the second set may contain bit positions (X+1) through (N−1).

Continuing with reference to N-bit values, monitor RAM 120 contains memory locations with X-bit addresses. That is, the number of bits in the address bus of monitor RAM 120 equals the number of bits in the first set. Each memory location contains the bits of a desired value at the second set of positions.

In one embodiment, monitor RAM 120 contains (N−X) bit words. In such a situation, the bits of a desired value corresponding to the first set form the memory address, and the remaining bits are stored in the memory location with the memory address. One problem with such an approach is that it may not be possible to monitor more than one desired value sharing the same bits in the first set of positions.

Accordingly, in an alternative embodiment illustrated with reference to FIG. 2, each memory location is shown containing four columns, with each column containing (N−X) bits. Thus, each memory location is logically viewed as containing a number of cells equal to the number of columns (i.e., 4 columns in each location in the present example). One bit in each cell is used as a flag. When the flag contains one logical value, the corresponding cell represents a valid desired value and another logical value indicates that the cell does not contain valid desired value. In an embodiment, a flag is implemented as a single bit.

Thus, the embodiment of FIG. 2 can be used to specify up to four desired values sharing the same bits in the positions corresponding to the first set. A monitor circuit corresponding to such an approach is described below.

Monitor circuit 130 is shown containing four comparators 230, 240, 250 and 260 corresponding to the four desired values specified by each memory location of monitor RAM 120. Each comparator compares the bits of a present value in the second set of positions (received on bus 155) and the same bit positions of a corresponding desired value stored in monitor RAM 120. Each comparator 230–260 generates one logical value (e.g., 1) if the two inputs match, and another logical value otherwise.

Thus, the outputs of the comparators can be used to determine whether a present value matches any of a desired values represented by monitor RAM 120. The operation of the circuit of FIG. 2 is described below with an example.

4. Example

As an example, it is assumed that the following four values ("desired values") are to be detected on bus 155, 01010 000011111 ("first desired value"), 01001 111110000 ("second desired value"), 01110 000101010 ("third desired value"), 01110 010101011 ("fourth desired value"). Each desired value is of 14 bit length and thus contains 14 bit positions numbered 0–13 for illustration. The bit positions are partitioned into two sets, the first set containing five bit positions (e.g., positions) 9–13. The second set contain the remaining nine bit positions, 0–8.

It should be understood that the bit positions in each of the sets need not be consecutive as in the above illustration. In addition, the number of bits in the first set and the second set need not equal the total number of bit positions in each value. When such an equality does not exist, the value in each cell represents a range of desired values. Furthermore, some of the less significant bits (i.e., 0–8 in the present example) can also be used as an address to monitor RAM 120 (instead of the more significant bits 9–13).

Continuing with the example, the first desired value is assigned to memory location 10 (01010) as the bits together in the first set of positions equals 10. The content of the first cell of memory location 10 is formed by ten bits, nine of which are set to 000011111 corresponding to the bits (of the first desired value) at the second set of positions. The flag in the tenth bit of the content of the cell is set to 1 to indicate the the cell contains a valid desired value. Similarly, the bits (111110000) in the second set of positions of the second desired value form the content of the cell at memory location 9 (01001).

The third and fourth desired values are assigned to location 14 (01110) as the values share the same value in the first set of positions. The contents of the first (corresponding to column left most column in FIG. 2) and second cells of location 14 may be respectively formed by 000101010 and 010101011 representing the bits in the second set of positions of the third and fourth desired values respectively. The corresponding flags are also set to 1. The flags of all the remaining cells (other than the four for the four desired values) may be set to 0 to indicate that no valid desired value is stored in the corresponding cells.

The manner in which a determination can be made as to whether a present value equals one of the desired values represented by monitor RAM 120 is described now. For illustration, it is assumed that the following three values ("present values") occur in different bus cycles (or time instances) on bus 155—00011 101010100 ("first present value"), 01001 000011111 ("second present value"), 01110 010101011 ("third present value"). Each bits is of 14 bit word length (same as the length of each desired value) and thus contains 14 bit positions numbered 0–13 for illustration. The present values are used in conjunction with the monitor RAM 120 and comparators 230, 240, 250 and 260 consistent with the partitioning approach (i.e., bits 0–8 in the first set of positions and bits 9–13 in the second set of positions) described above.

The presence of the first present value (00011 101010100) on bus 155 causes the contents of memory location 3 of monitor RAM 120 to be retrieved as the bits together in the first set of positions (of the first present value) equals 3 (00011). As the flags of all the four cells are pre-set to zero (indicating invalid data), all the comparators 230, 240, 250 and 260 generate a logical value (e.g., 0) to indicate that the first present value does not equal any of the desired values.

The presence of the second present value (01001 000011111) on bus 155 causes the contents of memory location 9 of monitor RAM 120 to be retrieved as the bits together in the first set of positions (of the second present value) equals 9 (01001). At memory location 9, the flag (ninth bit) in the first cell is pre-set to 1 as the second desired value is represented by the cell. Comparator 230 compares bits in the second set of positions of the second present value that is, 000011111, with the content of the first cell with memory location 9 (also 000011111), and generates a value of 1 to indicate that a match exists. The remaining comparators 240, 250 and 260 generate an output of 0 as the flags of the corresponding cells of location 9 are pre-set to 0.

Similarly, the presence of the third present value (01110 010101011) on bus 155 causes the four comparators to compare the contents of the respective four cells at location 14 with the bits (010101011) at the second set of positions of the third present value. The third and fourth comparators (250 and 260) generate an output of 0 as the flag of the corresponding bits is set to indicate that a valid present value is not represented. Comparator 230 generates an output of 0 as the cell contents (000101010) do not match 010101011. However, comparator 240 generates a 1 as the contents of the second cell match the bits in the second set of positions of the third present value.

Thus, the embodiments described above can be used to determine whether a present value transmitted on a bus equals any one of the desired values. The determination is performed quickly while using a small memory unit by using a convention provided in accordance with the present invention.

5. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A detection circuit for detecting the occurrence of a one of a plurality of desired values on a multibit bus, said detection circuit comprising:

a random access memory (RAM) receiving a first subset of plural bits of the multibit bus, said random access memory having a plurality of locations addressed by said first subset of plural bits, each of said plurality of locations storing a plurality of bits, said random access memory outputting said plural bits stored at said location addressed by a current value of said first subset of plural bits of the multibit bus, said random access memory storing at a location addressed by said first subset of plural bits of each desired value plural bits corresponding to a second subset of plural bits of said desired value, said second subset of plural bits not overlapping said first subset of plural bits; and a comparator receiving said second subset of plural bits of the multibit bus and said plural bits output by said random access memory, said comparator generating a match output indicating a match whenever each bit of said plural bits output by said random access memory matches a corresponding bit of said second subset of plural bits of the multibit bus.

2. The detection circuit of claim 1, wherein:

each of said plurality of locations of said random access memory storing a plurality of cells, each of said plurality of cells containing a number of bits equal to the number of bits of said second subset of plural bits, random access memory outputting said plural bits stored at each of said plurality of cells of said location addressed by a current value of said first subset of plural bits of the multibit bus; and said comparator receiving said plural bits output by said random access memory for each of said plurality of cells, said comparator generating a match output indicating a match whenever each bit of said plural bits of any one of said plurality of cells output by said random access memory matches a corresponding bit of said second subset of plural bits of the multibit bus.

3. The detection circuit of claim 2, wherein:

each of said plurality of cells of said random access memory further includes a flag indicating whether the corresponding cell stores a valid desired value; and said comparator generating a match output indicating a match whenever each bit of said plural bits of one of said plurality of cells output by said random access memory matches a corresponding bit of said second subset of plural bits of the multibit bus and said corresponding flag indicates said corresponding cell stores a valid desired value.

4. The detection circuit of claim 2, wherein:

said comparator includes a plurality of sub-comparators equal in number to the number of said plurality of cells, wherein each of said plurality of sub-comparators receives said second subset of plural bits of the multibit bus and said plural bits output form a corresponding cell of said plurality of cells by said random access memory, each sub-comparator generating a match output indicating a sub-match whenever each bit of said plural bits of said corresponding cell output by said random access memory matches a corresponding bit of said second subset of plural bits of the multibit bus; and said comparator indicating a match if any sub-comparator indicates a sub-match.

5. The detection circuit of claim 1, wherein:

each of said desired values includes a plurality of N bits, wherein N is a positive integer; and wherein a sum of the number of bits in said first subset of plural bits and the number of bits in said second subset of plural bits equals N.

6. The detection circuit of claim 1, wherein:

said bits of the multibit bus are disposed in a sequence of bits; and said first subset of plural bits and said second subset of plural bits are consecutive in the sequence of bits of the multibit bus.

7. The detection circuit of claim 1, wherein:

said bits of the multibit bus are disposed in a sequence of bits; and at least one of said first subset of plural bits and said second subset of plural bits are nonconsecutive in the sequence of bits of the multibit bus.

8. A system comprising:

an addressable unit;

a data processor;

a multibit bus connected to said addressable unit and said data processor, said multibit bus transferring addresses and data between said addressable unit and said processor;

a monitor memory receiving a first subset of plural bits of the multibit bus, said monitor memory having a plurality of locations addressed by said first subset of plural bits, each of said plurality of locations storing a plurality of bits, said monitor memory outputting said plural bits stored at said location addressed by a current value of said first subset of plural bits of the multibit bus, said monitor memory storing at a location addressed by said first subset of plural bits of each desired value plural bits corresponding to a second subset of plural bits of said desired value, said second subset of plural bits not overlapping said first subset of plural bits; and a comparator receiving said second subset of plural bits of the multibit bus and said plural bits output by said monitor memory, said comparator generating a match output indicating a match whenever each bit of said plural bits output by said monitor memory matches a corresponding bit of said second subset of plural bits of the multibit bus.

9. The system of claim 8, wherein:

each of said plurality of locations of said monitor memory storing a plurality of cells, each of said plurality of cells containing a number of bits equal to the number of bits of said second subset of plural bits, said monitor memory outputting said plural bits stored at each of said plurality of cells of said location addressed by a current value of said first subset of plural bits of the multibit bus; and said comparator receiving said plural bits output by said monitor memory for each of said plurality of cells, said comparator generating a match output indicating a match whenever each bit of said plural bits of one of said plurality of cells output by said monitor memory matches a corresponding bit of said second subset of plural bits of the multibit bus.

10. The system circuit of claim 9, wherein:

each of said plurality of cells of said monitor memory further includes a flag indicating whether the corresponding cell stores a valid desired value; and said comparator generating a match output indicating a match whenever each bit of said plural bits of any one of said plurality of cells output by said monitor memory matches a corresponding bit of said second subset of plural bits of the multibit bus and said corresponding flag indicates said corresponding cell stores a valid desired value.

11. The system of claim 9, wherein:

said comparator includes a plurality of sub-comparators equal in number to the number of said plurality of cells, wherein each of said plurality of sub-comparators receives said second subset of plural bits of the multibit bus and said plural bits output form a corresponding cell of said plurality of cells by said monitor memory, each sub-comparator generating a match output indicating a sub-match whenever each bit of said plural bits of said corresponding cell output by said monitor memory matches a corresponding bit of said second subset of plural bits of the multibit bus; and said comparator indicating a match if any sub-comparator indicates a sub-match.

12. The system of claim 8, wherein:

each of said desired values includes a plurality of N bits, wherein N is a positive integer; and wherein a sum of the number of bits in said first subset of plural bits and the number of bits in said second subset of plural bits equals N.

13. The system of claim 8, wherein:

said bits of the multibit bus are disposed in a sequence of bits; and said first subset of plural bits and said second subset of plural bits are consecutive in the sequence of bits of the muitibit bus.

14. The system of claim 8, wherein:

said bits of the multibit bus are disposed in a sequence of bits; and at least one of said first subset of plural bits and said second subset of plural bits are nonconsecutive in the sequence of bits of the multibit bus.

* * * * *